March 21, 1961   C. E. SHEETZ   2,976,007
DRIVE MECHANISM FOR A BAGGING MACHINE
Filed Sept. 17, 1957   9 Sheets-Sheet 1
FIG_1
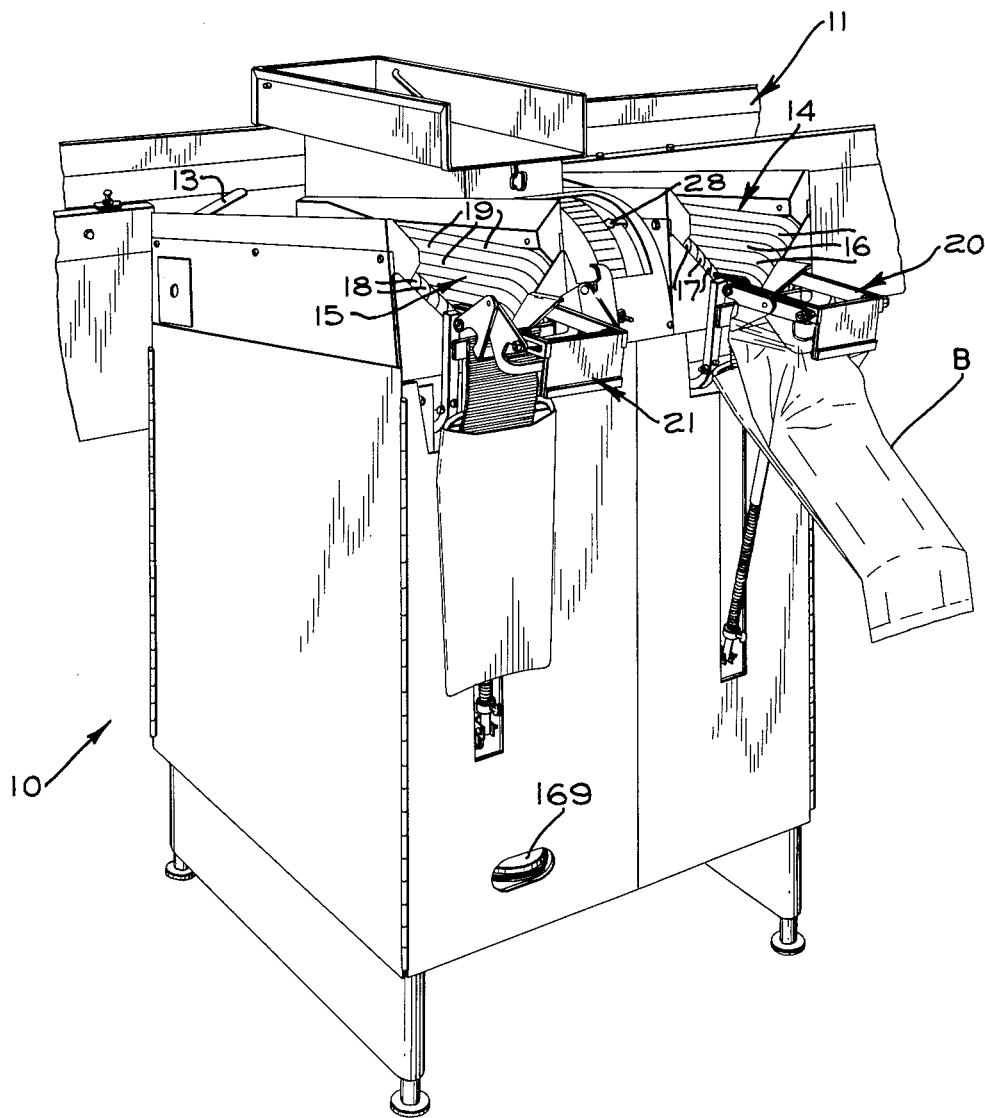
INVENTOR
CHARLES E. SHEETZ
BY Hans G. Hoffmeister
ATTORNEY

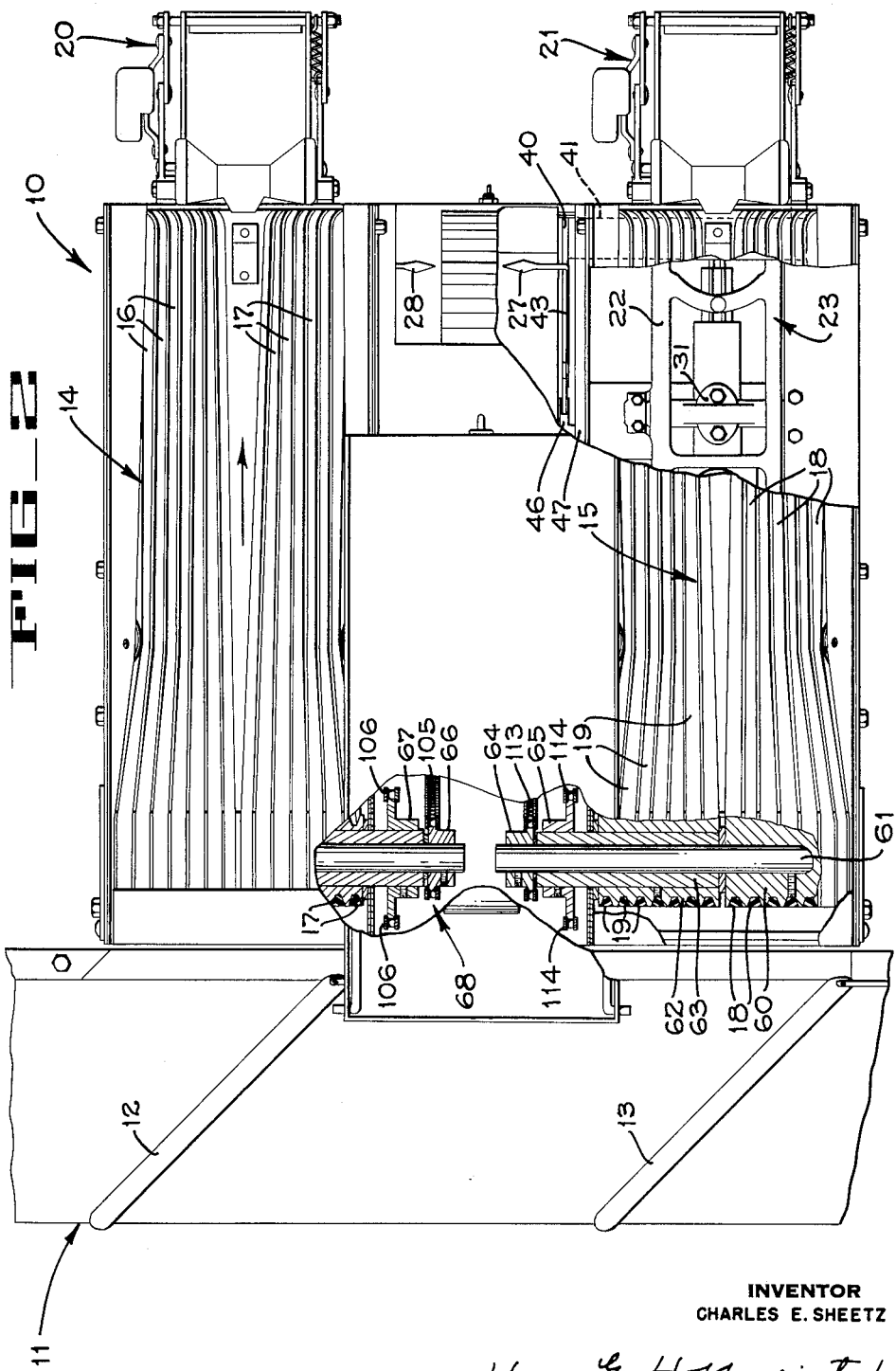

March 21, 1961 C. E. SHEETZ 2,976,007
DRIVE MECHANISM FOR A BAGGING MACHINE
Filed Sept. 17, 1957 9 Sheets-Sheet 3
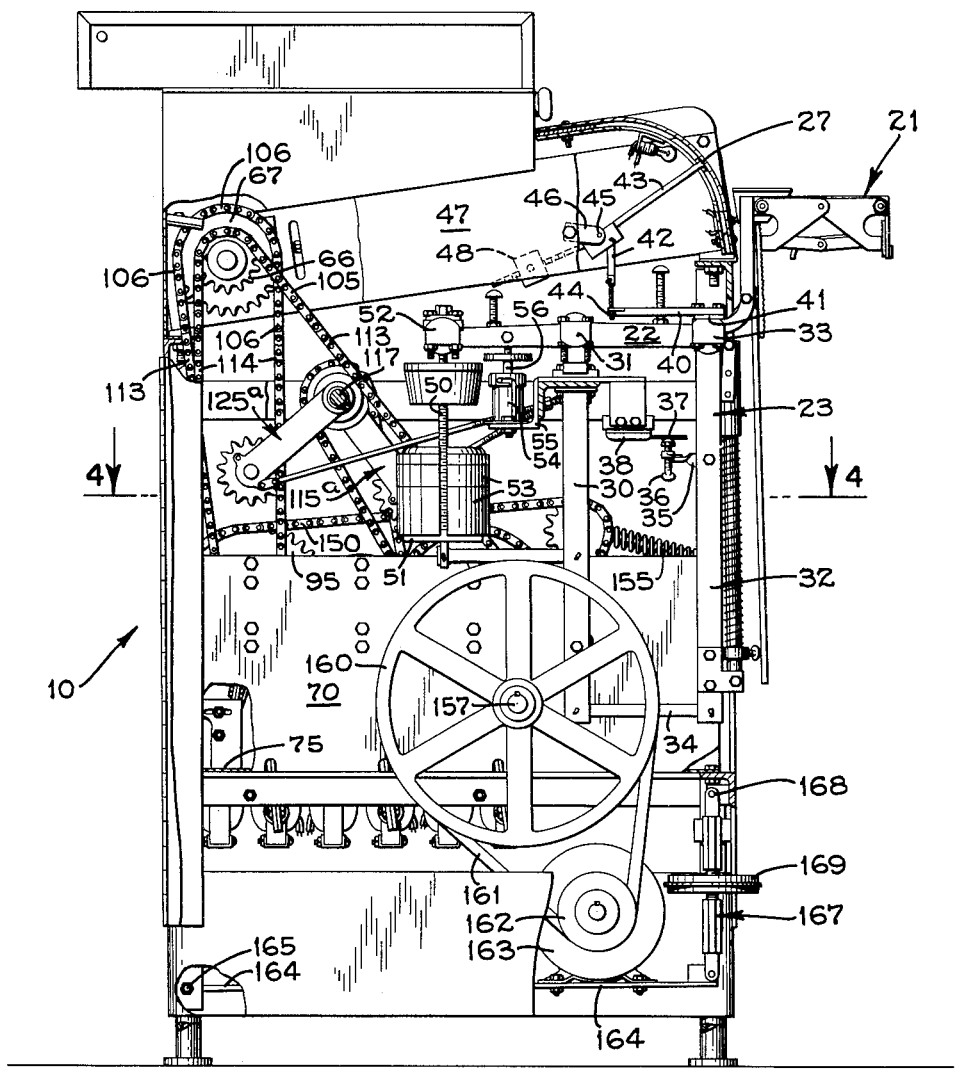
FIG_3
INVENTOR
CHARLES E. SHEETZ
BY Hans G. Hoffmeister
ATTORNEY

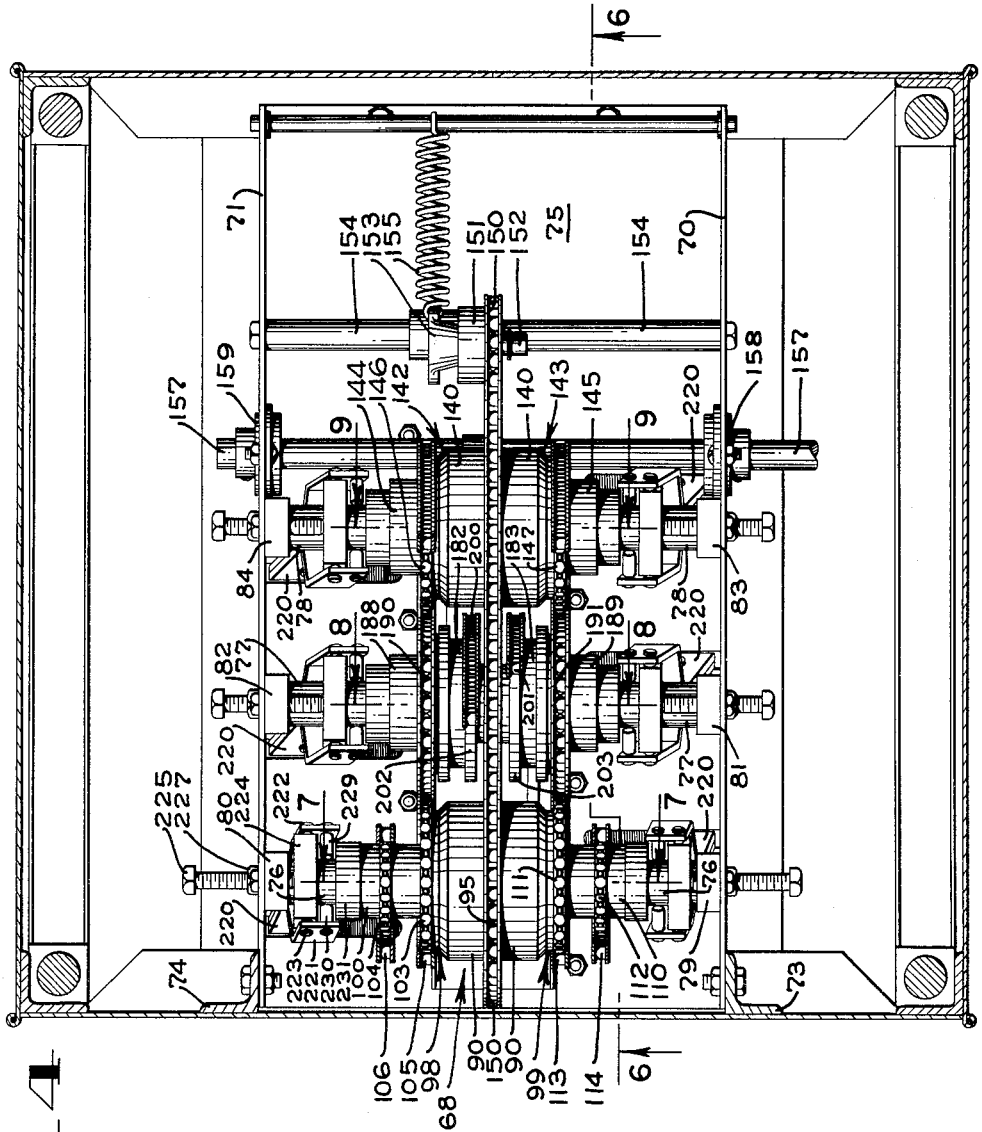

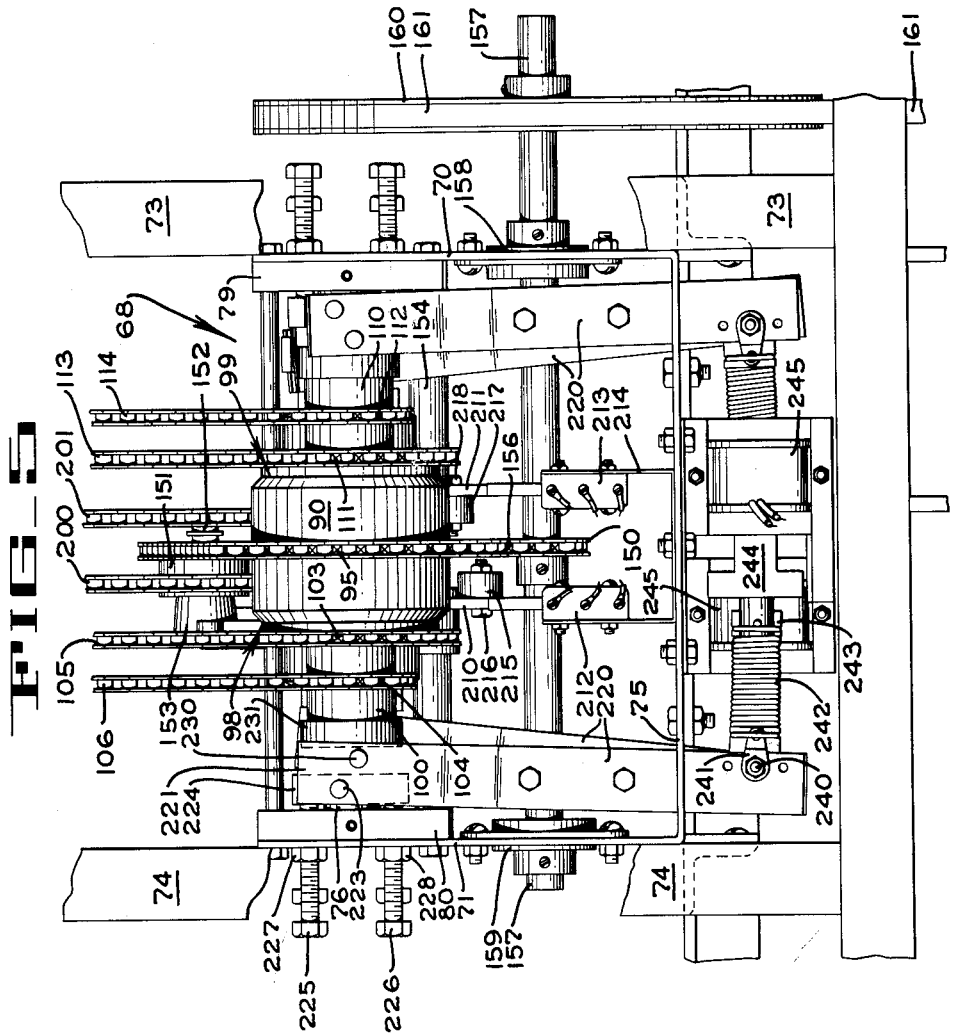

March 21, 1961  C. E. SHEETZ  2,976,007
DRIVE MECHANISM FOR A BAGGING MACHINE
Filed Sept. 17, 1957  9 Sheets-Sheet 6
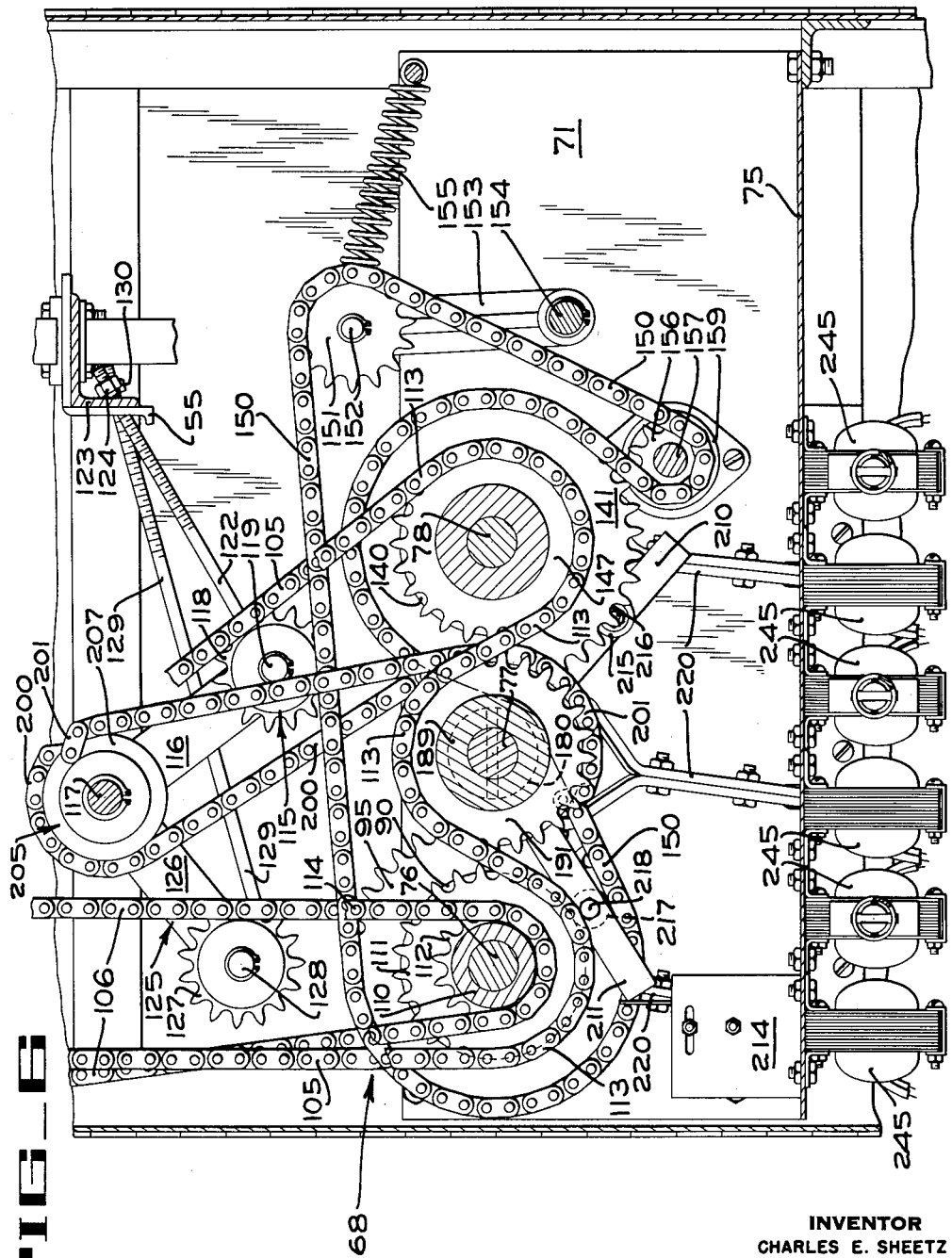
FIG_6
INVENTOR
CHARLES E. SHEETZ
BY Hans G. Hoffmeister
ATTORNEY March 21, 1961 C. E. SHEETZ 2,976,007
DRIVE MECHANISM FOR A BAGGING MACHINE
Filed Sept. 17, 1957 9 Sheets-Sheet 7
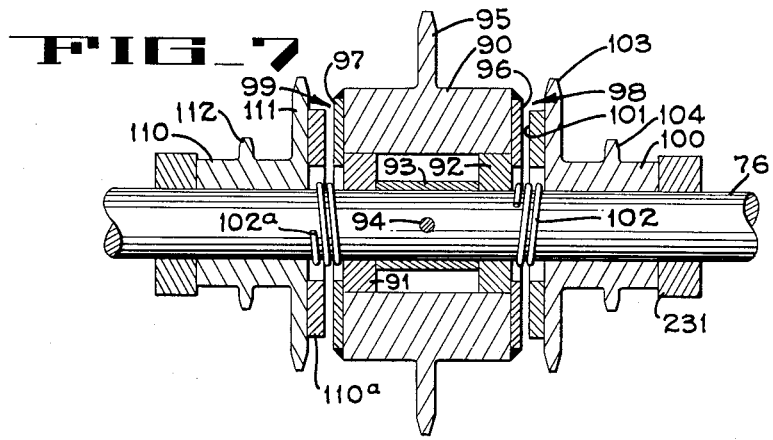
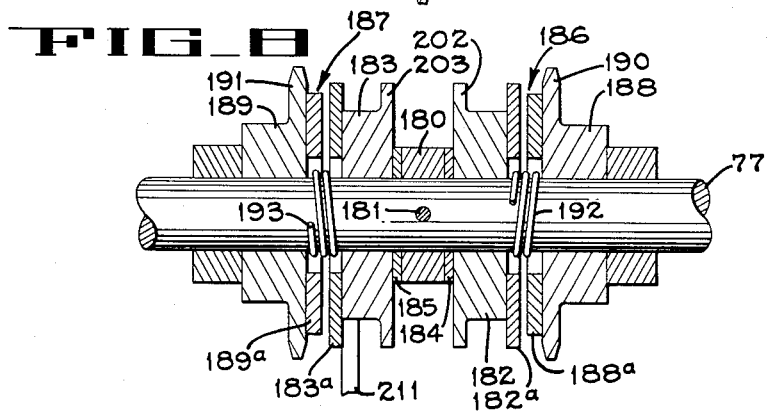
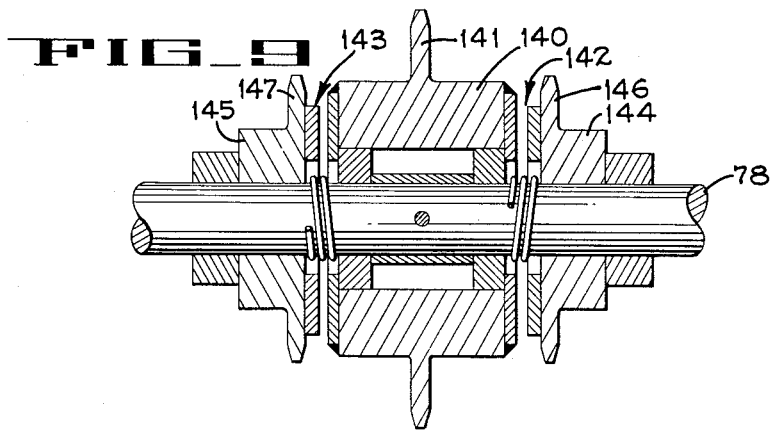
INVENTOR
CHARLES E. SHEETZ
BY Hans G. Hoffmeister
ATTORNEY March 21, 1961  C. E. SHEETZ  2,976,007
DRIVE MECHANISM FOR A BAGGING MACHINE
Filed Sept. 17, 1957  9 Sheets-Sheet 8
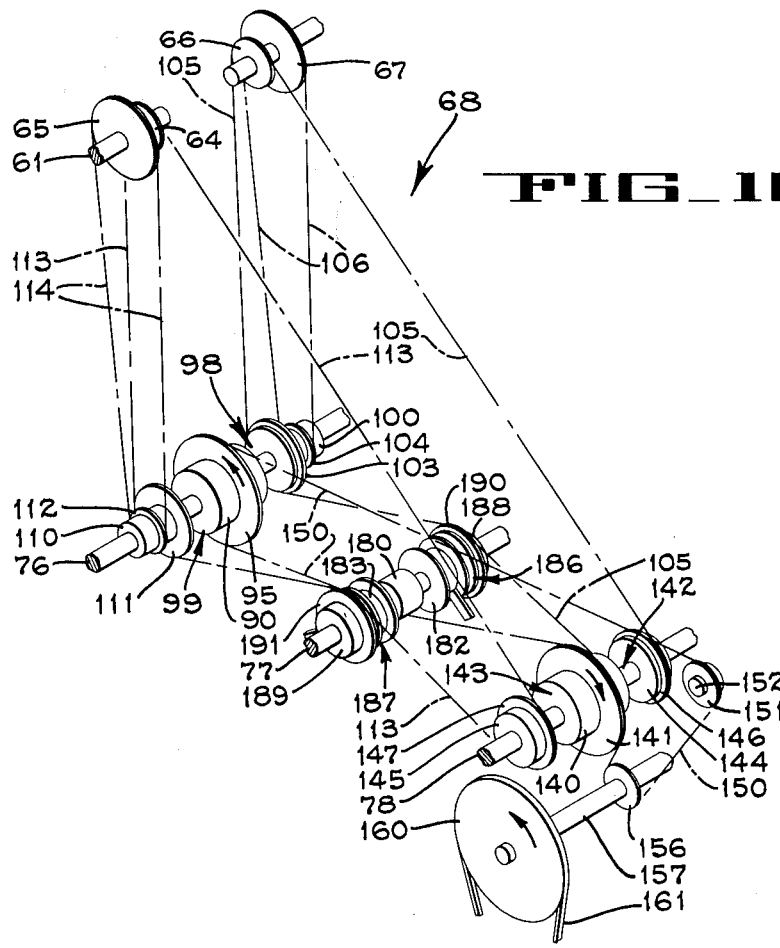
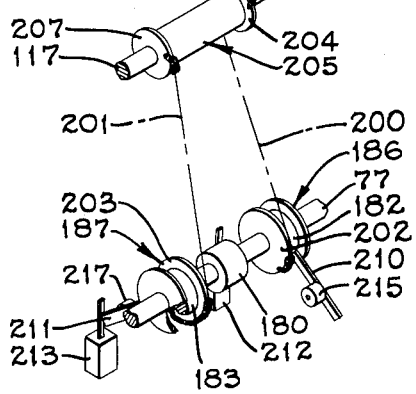
INVENTOR
CHARLES E. SHEETZ
BY Hans G. Hoffmeister
ATTORNEY

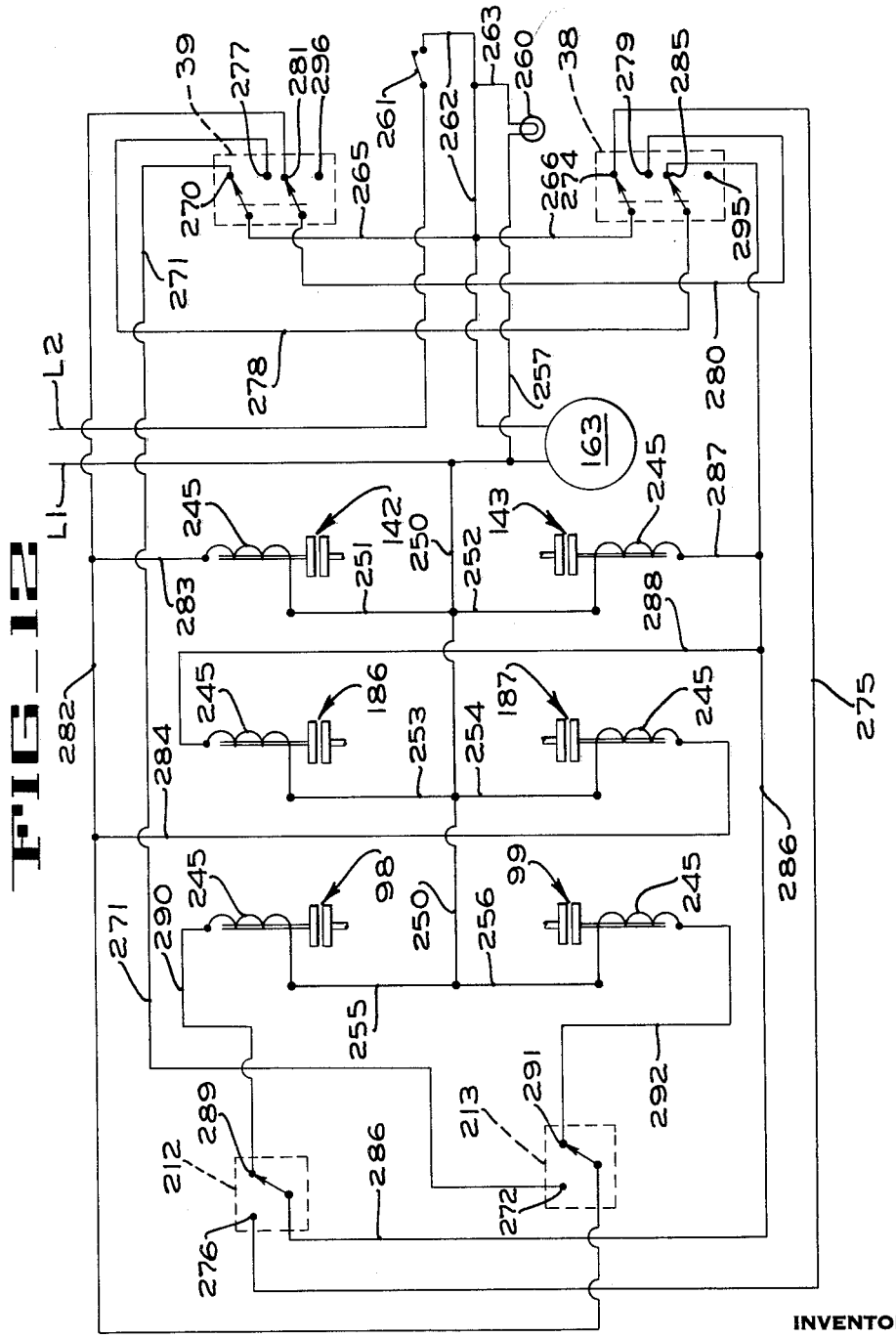

United States Patent Office 2,976,007
Patented Mar. 21, 1961

2,976,007

DRIVE MECHANISM FOR A BAGGING MACHINE

Charles A. Sheetz, Woodstock, Va., assignor to Food Machinery and Chemical Corporation, San Jose, Calif., a corporation of Delaware Filed Sept. 17, 1957, Ser. No. 684,502

15 Claims. (Cl. 249—62)

This invention pertains to bagging machines, and more particularly to mechanism for driving bagging machines or similar machines.

One object of the present invention is to provide an efficient, economical drive mechanism for the feed belts of a machine adapted to deposit articles in bags.

Another object of the invention is to provide an efficient drive mechanism capable of automatically reversing the direction of movement of the articles being advanced, when a desired weight of articles has been delivered to a bag.

Another object of the invention is to provide an improved control mechanism for the drive mechanism of a bagging machine.

Referring now to the drawings, wherein similar reference numerals are used to designate the same elements throughout the various views shown:

Fig. 1 is a perspective view of a bagging machine constructed in accordance with the teachings of the present invention.

Fig. 2 is a plan view of the machine of Fig. 1 with certain parts broken away to illustrate structure thereabeneath.

Fig. 3 is a side elevation, with the side panel of the machine removed and with certain parts broken away to show details of the operating mechanism.

Fig. 4 is a section taken on line 4—4 of Fig. 3.

Fig. 5 is a fragmentary rear elevation of the drive mechanism of the machine, with parts broken away, and particularly showing a clutch actuating mechanism.

Fig. 6 is a fragmentary section taken on line 6—6 of Fig. 4.

Figs. 7, 8 and 9 are vertical sections taken on lines 7—7, 8—8 and 9—9, respectively, of Fig. 4.

Fig. 10 is a schematic perspective of a part of the drive mechanism.

Fig. 11 is a schematic perspective of the reverse drive timing mechanism.

Fig. 12 is a schematic wiring diagram of the machine.

In the following description of the bagging machine of the present invention, the following terminology will be used throughout: the portion of the machine at which the bag holders are located, and at which the operator stands, will be designated as the front of the machine. The portion adjacent the article conveyor, which delivers articles to the present bag filling machine, will be designated as the rear of the machine. The right and left sides will be taken as the sides to the right and left of an operator standing in front of and facing the machine.

Referring now to Figs. 1 and 2, the bagging machine 10 is mounted adjacent one side of an article delivery conveyor 11, and two diagonal guide members 12 and 13, disposed across the conveying surface of the conveyor 11, are adapted to guide articles from the conveyor 11 into two feed troughs 14 and 15, respectively, on the machine 10. Two sets of feed belts 16 and 17 are mounted within the trough 14. The conveying surface formed by the belts 16 and 17 has a flat contour, adjacent the delivery conveyor 11, which progressively changes to a V-shaped contour at the discharge end of the machine. This conveying surface is effective to align the articles conveyed thereon in single file at the discharge end, in the manner fully described in my prior copending application Serial No. 527,946, filed August 12, 1955, and entitled "Article Aligning Machine," now Patent No. 2,813,617, dated November 19, 1957. Similarly, two sets of feed belts 18 and 19 are mounted on the opposite side of the machine within the feed trough 15 for aligning and discharging articles from that trough.

The feed belts 16 and 17, when driven forwardly in the direction indicated by the arrow in Fig. 2, are adapted to deposit articles in a bag B (Fig. 1) held adjacent the delivery end of the machine by a bag holding mechanism 20 which is fully described in my copending application Serial No. 684,199, filed September 16, 1957, and entitled "Bag Holding Apparatus." The feed belts 18 and 19 similarly feed articles to a bag adapted to be held by a bag holder 21.

The bag holder 21 (Fig. 3) is mounted on a scale beam 22 of a scale mechanism 23, and the bag holder 20 is mounted on a similar scale mechanism (not shown). The two mechanisms are connected to indicating pointers 27 and 28, respectively (Figs. 1, 2 and 3) located at the front of the machine 10 between the bag holders 20 and 21 whereby the operator may see if the weight of articles deposited in the bags held by the bag holders is within the permitted tolerance.

Since the two scale mechanisms are similar only one will be described in detail. The scale mechanism 23 comprises a fixed vertical post 30 (Fig. 3) and the previously mentioned scale beam 22 which is balanced on a knife edge assembly 31 at the upper end of the fixed post 30. A vertical post 32 is connected by a knife edge assembly 33 to the forward end of the beam 22, adjacent the connection between the bag holder 21 and the beam 22, and extends downwardly therefrom. A horizontal link 34 is pivotally connected at one of its ends to the lower end of the post 30 and at its other end to the post 32 and, with the scale beam 22, completes a parallelogram structure whereby the post 32 may move up and down with the forward end of the scale beam 22 but will always remain parallel to the fixed post 30. A bracket 35 is fixed to the post 32 and an adjustable stop screw 36 is threaded through a suitably threaded opening therein and is adapted to contact the underside of a switch actuating arm 37 of a double pole, double throw switch 38 that is carried by the scale mechanism. When the scale beam moves upwardly the screw 36 contacts the arm 37 and actuates the switch 38 and, when a predetermined weight accumulates within a bag held by the bag holder 21, the scale beam rocks clockwise (Fig. 3) about the knife edge 31 moving the screw 36 downwardly and releasing the switch 38, which then snaps to its release position. It will be understood that the scale mechanism on the other side of the machine is operatively connected to a similar switch 39 which is shown only in the control diagram of Fig. 12.

A bracket 40 is fixed to and extends rearwardly from a laterally extending bar 41 (Fig. 2) that is mounted on the forward knife edge assembly 33. A link 42 (Fig. 3) is pivotally connected at one of its ends to an indicator arm 43. The other end of the link 42 is adjustably connected at 44 to the bracket 40. The indicator arm 43 is pivotally mounted at 45 on a bracket 46 fixed to the trough frame 47. The forward end of the arm 43 carries the previously mentioned scale indicating pointer 27.

A counterweight assembly, comprising a rod 50 and a plate 51 fixed to the lower end thereof, is suspended from a knife edge assembly 52 of the rear end of the scale beam 22. Removable, slotted counterweights 53 are placed on the plate 51 in desired amounts to preset the scale so that, when articles having a predetermined weight are deposited in the bag suspended from the bag holder 21, the scale beam will move downwardly to release the switch 38. Fine adjustments of the scale mechanism are made by rotating a weight 48, threadedly received on the rear portion of the arm 43, to change its position relative to the pivot point 45. A dash pot 54 is mounted on a bracket 55 to the frame of the machine and is connected to the scale beam 22 by a link 56 to cushion the shock of the clockwise rotation of the scale beam when a loaded bag is released from the bag holder 21.

Referring to Fig. 2, the feed belts 18 are driven by a multi-grooved pulley 60 fixed to a shaft 61 suitably journaled for rotation on the frame of the machine. The belts 19 are driven by a similar multi-grooved pulley 62 fixed to a sleeve 63 rotatably mounted on the shaft 61. A drive sprocket 64 is fixed to the shaft 61 and a drive sprocket 65 is fixed to the sleeve 63. The two sets of feed belts 18 and 19 in the trough 15 are thus independently driven and, due to the difference in size of the sprockets 64 and 65, are driven at different speeds in the manner described in my above mentioned application Ser. No. 527,946. The feed belts 16 and 17 are similarly driven through sprockets 66 and 67 (Figs. 2 and 3).

The sprockets 64, 65, 66 and 67 are part of a drive mechanism 68 (Fig. 4) which includes two side plates 70 and 71 (Figs. 3 and 4) fixed to frame members 73 and 74, respectively, and connected by a bottom plate 75. Three stationary parallel horizontal shafts 76, 77 and 78 (Figs. 4 and 6) are mounted between the side plates 70 and 71. The shaft 76 is mounted in blocks 79 and 80, respectively; the shaft 77 is mounted in blocks 81 and 82, respectively; and the shaft 78 is mounted in blocks 83 and 84, respectively. The blocks 79, 81 and 83 are fixed to the plate 70, and the blocks 80, 82 and 84 are fixed to the plate 71.

A drum 90 is rotatably mounted on the central portion of the shaft 76 (Figs. 4 and 5). The drum 90 rotates on two internal bearings 91 and 92 (Fig. 7) which are located one on either side of a sleeve 93 that is fixed to the shaft 76 by a pin 94. A large sprocket 95 is formed on the outer surface of the drum and is adapted to be driven by a chain described hereinbelow. The outwardly facing side surfaces 96 and 97 of the drum 90 are clutch faces whereby the drum 90 is the driving element for two clutches generally indicated 98 and 99. The movable clutch element of clutch 98 is a sleeve 100 slidably and rotatably mounted on the shaft 76 and having a clutch face 101 at its inner end adapted to abut the clutch face 96 on the drum 90 when the clutch 98 is engaged. A spring 102 normally keeps the clutch faces 96 and 101 apart. The movable clutch member 100 carries two sprockets 103 and 104 which are connected by drive chains 105 and 106 (Figs. 5 and 10) to the previously mentioned drive sprockets 66 and 67, respectively, of the feed belts 16 and 17.

The movable element of the clutch 99 is a sleeve 110 identical to the sleeve 100 of the clutch 98 and having a clutch face 110a held in spaced relation to clutch face 97 by a spring 102a. The sleeve 110 is provided with two sprockets 111 and 112 which drive two chains 113 and 114 (Figs. 5 and 10) connected to the drive sprockets 64 and 65 (Fig. 2) of the feed belts 18 and 19, respectively.

A chain tightener 115 (Fig. 6) is provided for the chain 105 and comprises an arm 116 rotatably mounted at one of its ends on a shaft 117 fixed to the frame of the machine. An idler sprocket 118 is rotatably mounted on a stub shaft 119 fixed to the other end of the arm 116 and is in engagement with the chain 105. A rod 122 is pivotally connected to the arm 116 adjacent the outer end thereof and extends through a suitable opening in a bracket 123 fixed to the machine frame. A nut 124 is threaded on the rod 122, whereby, by tightening the nut 124 the arm 116 will be rotated counterclockwise to tighten the chain 105. A similar chain tightener 125 having an arm 126 and a sprocket 127 rotatably mounted on stub shaft 128 is in contact with the chain 106. The arm 126 is actuated by a rod 129 extending through a second suitable opening in the bracket 123 and having a nut 130 threaded thereon. Similar chain tighteners 115a and 125a (Fig. 3) are provided for the chains 113 and 114, respectively.

The arrangement on the shaft 78 (Figs. 4, 9 and 10) is essentially the same as that on shaft 76 described above. A central drive hub 140, carrying a large sprocket 141, is rotatably mounted on the shaft 78 and forms the central drive element for two clutches generally indicated 142 and 143. The difference between the arrangement on shaft 76 and that on shaft 78 is that the movable sleeve members 144 and 145 of the clutches 142 and 143, respectively, only carry one sprocket each, 146 and 147, about which the previously mentioned chains 105 and 113, respectively, are trained.

A drive chain 150 (Figs. 6 and 10) is trained over the top of the sprocket 141 on shaft 78 and beneath the center shaft 77 and around the bottom of the sprocket 95 to drive the drums 90 and 140 in opposite directions. The chain 150 is trained around an idler sprocket 151 rotatably mounted on a stub shaft 152 fixed to an arm 153 rotatably mounted on a shaft 154 that is fixed between the side plates 70 and 71. A spring 155 urges the arm to rotate clockwise, as viewed in Fig. 6, to eliminate slack from the chain 150. The chain 150 is trained around and is driven by a sprocket 156 fixed to a drive shaft 157 rotatably mounted in bearings 158 and 159 (Fig. 4) fixed to the side plates 70 and 71. A pulley 160 (Figs. 3 and 10) is fixed to the shaft 157 and is drivingly connected by a belt 161 to a variable speed drive pulley 162 fixed to the shaft of a motor 163. The motor 163 is mounted on a plate 164 pivotally attached to the machine frame at 165. The other end of the plate 164 is pivotally connected to one end of a turnbuckle assembly 167 the other end of which is pivotally connected to the machine frame at 168. By rotating the wheel 169 of the turnbuckle assembly 167, the plate 164, and the motor 163 mounted thereon, may be raised and lowered, thus changing the effective diameter of the variable speed drive pulley 162 to change the speed of rotation of the clutch drums 90 and 140.

It will be noted from the direction arrows in Fig. 10 that the drum 140 is always rotated in a clockwise direction by chain 150 while the drum 90 is always rotated counterclockwise. Thus, the chain 113 may be driven in one direction or the other by selectively engaging either clutch 99 or clutch 143. Similarly the chain 105 may be driven in either direction by selectively engaging the clutch 98 or the clutch 142. The clutches 142 and 143, when engaged, drive the chains 105 and 113 in a direction to move the feed belts 16, 17, 18 and 19 in their forward direction, and conversely the clutches 98 and 99, when engaged, drive the feed belts in reverse. The clutches 142 and 143 will be referred to as the forward drive clutches, while clutches 98 and 99 will be called reverse drive clutches.

The center shaft 77 carries the timing and switching mechanism for the automatic timing of the reverse movement of the belts and the alternate operation of the feed belts. A central hub 180 (Figs. 8, 10 and 11) is pinned to shaft 77 by a pin 181. Two sleeves 182 and 183 are rotatably mounted on the shaft 77, one on either side of the fixed hub 180, and are separated from hub 180 by thrust washers 184 and 185. The sleeves 182 and 183 are identical and are the driven members of two clutches generally indicated 186 and 187. The driving members of the two clutches 186 and 187 are two sleeves 188 and 189, respectively, each rotatably and slidably mounted on the shaft 77. Clutch faces 182a and 188a are held in spaced relation by a spring 192, and faces 183a and 189a are similarly separated by a spring 193. The members 188 and 189 carry sprockets 190 and 191, respectively, about which the previously described chains 105 and 113 are trained. Thus, it may be seen that the driving members 188 and 189 may be rotated either clockwise or counterclockwise depending on which of the clutches 98, 99, 142 and 143 are engaged. As it will appear ultimately from the description of the operation of the machine, the clutches 186 and 187 are never engaged while the driving members 188 and 189 thereof are being rotated counterclockwise as viewed in Fig. 6, and are never both engaged at the same time.

The driven members 182 and 183 of clutches 186 and 187 are interconnected by a timing mechanism (Fig. 11) such that when one of the clutches 186 or 187 is engaged to drive its associated driven member 182 or 183 clockwise the other driven member is rotated counterclockwise.

The interconnection between the two driven members 182 and 183 comprises a pair of timing chains 200 and 201 (Figs. 5 and 11). The chain 200 is wrapped around a toothless sprocket, or disc, 202 (Figs. 8 and 11) carried by the driven member 182 of the clutch 186 and is pinned thereto. Similarly, the chain 201 is wrapped around a toothless sprocket, or disc, 203 carried by the driven member 183 of the clutch 187 and is pinned thereto. The other end of the chain 200 is wrapped around and pinned to one toothless sprocket, or disc 204 of a double sprocket, or spool, 205 (Figs. 6 and 11) rotatably mounted on the previously mentioned transversely extending shaft 117. The chain 201 is wrapped around and pinned to the other toothless sprocket, or disc, 207 of the spool 205. As shown in Figs. 6 and 11, the chains 200 and 201 extend in a clockwise direction part way around the discs 202 and 203 of the driven members 182 and 183. However, while the other end of the chain 200 is also wrapped clockwise about disc 204 of the spool 205, the other end of the chain 201 is wrapped counterclockwise about disc 207 of the spool 205. When the reverse clutch 98 and the timing clutch 186 are engaged, the clutch member 182 is rotated clockwise thus pulling chain 200 downwardly (Fig. 11) and rotating the spool 205 counter clockwise. The counterclockwise movement of the spool 205 pulls the chain 201 upwardly and rotates the member 183 counterclockwise. In summary, when the right side reverse clutch 98 and the right side timing clutch 186 are engaged, the right side feed belts 18 and 19 move rearwardly, the right side drive member 182 is rotated clockwise, and the left side drive member 183 is rotated counterclockwise. Similarly, when the left side reverse clutch 99 and the left side timing clutch 187 are engaged, the left side feed belts 16 and 17 are moved rearwardly, the left side drive member 183 is rotated clockwise and the right side drive member 182 is rotated counterclockwise.

The purpose of the above described timing mechanism is to operate a pair of switch actuating arms 210 and 211 (Figs. 5 and 6) mounted on the members 182 and 183, respectively, and extending radially outwardly therefrom. When the arm 210 is moved to its rearmost position by clockwise rotation of the drive member 182, it actuates a single pole, double throw, microswitch 212 (Figs. 5 and 12) mounted on a suitable bracket 214 fixed to the bottom plate 75. Similarly, when the arm 211 is moved to its rearmost position by clockwise rotation of drive member 183, it actuates a single pole, double throw switch 213. The arm 210 is provided with a roller 215 mounted on a bolt 216 fixed to the arm 210 and a similar roller 217 is mounted on a bolt 218 on the arm 211. When either the arm 210 or 211 is in its rearmost position, its associated roller 215 or 217 contacts and rides on the surface of the drum 90 as seen in Fig. 6.

The six clutches 98, 99, 142, 143, 186 and 187 all have identical actuating mechanisms and only the actuator for clutch 98 will therefore be described in detail.

The right reverse clutch 98 (Fig. 5) is provided with a clutch actuating arm 220, which has a yoke portion 221 at its upper end and is pivotally mounted on a pair of pivot pins 222 and 223 (Fig. 4) fixed to a block 224 slidably mounted on the shaft 76 outwardly of the movable clutch sleeve 100. A pair of adjustment screws 225 and 226 (Fig. 5) are threaded through suitable threaded openings in the shaft mounting block 80, one above and one below the shaft 76, and bear against the outer surface of the clutch actuating arm mounting block 224. The adjusting screws 225 and 226 are adapted to be locked in their adjusted positions by lock nuts 227 and 228. A pair of clutch actuating pins 229 and 230 (Fig. 4) are fixed to the yoke portion 221 of the arm 220 inwardly and below the pivot pins 222 and 223 and bear against the outer end of a bearing 231 which in turn bears against the outer end of the sleeve member 100, whereby, when the lower end of the actuating arm 220 is moved inwardly (to the right as viewed in Fig. 5), the member 100 is moved into clutching engagement with the drive drum 90.

The lower end of the clutch actuator arm 220 is pivotally connected at 240 to a spring holder 241 connected to one end of a tension spring 242. The other end of the spring 242 is connected to a spring holder 243 fastened to the plunger 244 of a solenoid 245. Thus, when the solenoid 245 is energized the plunger 244 is moved to the right and through the tension spring 242 moves the clutch arm 220 to the right to actuate the clutch 98 in the manner described above.

In the wiring diagram (Fig. 12) conductors L1 and L2 are lines connected to a suitable source of power. L1 is the common line and is connected directly to one terminal of the drive motor 163, and by branch lines 250, 251, 252, 253, 254, 255, 256 and 257 to one terminal of each of the six solenoid-actuated clutches 98, 99, 142, 143, 186 and 187 and to an indicator light 260.

Line L2 is connected to one side of the master switch 261. The other side of the switch 261 is connected by a line 262 to the opposite terminal of the motor 163, and by a branch line 263 to the opposite terminal of the indicator light 260. Whenever the switch 261 is closed the indicator light will be lit through a circuit comprising L2, switch 261, line 262, line 263, line 257 and L1. The motor 163 will be energized through line L2, switch 261, line 262 and line L1.

The switches 38 and 39 are double pole, double throw, switches normally held in their upper positions illustrated in Fig. 12 by the two scale mechanisms. Each of the switches is adapted to automatically snap to its lower position when released by the downward movement of its associated scale mechanism. The switch 38 is associated with and actuated by the left scale mechanism as viewed in Fig. 1 and the switch 39 is actuated by the right scale mechanism.

The switches 212 and 213 (Fig. 12) are single pole, double throw, switches and are shown in their release position. The switches 212 and 213 are adapted to be moved to the left as viewed in Fig. 12 by the action of the arms 210 and 211, respectively, which are carried by the timing mechanism, in the manner described above, and return automatically to their release position illustrated when not contacted by said arm.

A branch line 265 connects the line 262 to the upper blade of the switch 39, and a similar branch line 266 connects the line 262 to the upper blade of the switch 38. The teminal 270 of the switch 39 is connected by a line 271 to the terminal 272 of the switch 213. Similarly, the terminal 274 of the switch 38 is connected by a line 275 to the terminal 276 of the switch 212.

The terminal 277 of the switch 39 is connected by a line 278 to the lower blade of the switch 38. Similarly, the terminal 279 of the switch 38 is connected by a line 280 to the lower blade of the switch 39.

The terminal 281 of switch 39 is connected by a line 282 to the blade of switch 213, and by branch lines 283 and 284 to the opposite terminals of the right side forward drive clutch 142 and the left side timing clutch 187, respectively. Similarly, the terminal 285 of the switch 38 is connected by a line 286 to the blade of switch 212 and by branch lines 287 and 288 to the opposite terminals of the left forward drive clutch 143 and the right timing clutch 186, respectively.

The terminal 289 of the switch 212 is connected by a line 290 to the other terminal of the right rearward drive clutch 98. Similarly, the terminal 291 of the switch 213 is connected by a line 292 to the other terminal of the left rearward drive clutch 99.

The operation of the machine is best described in conjunction with the schematic wiring diagram which depicts the condition of the various switches when both the left and right hand scales are up, i.e., the bags held by the bag holders 20 and 21, respectively, are empty, and the timing arms 210 and 211 (Fig. 6) are in an intermediate position so that neither of the switches 212 or 213 is actuated and therefore the switches are in their released position illustrated in Fig. 12.

When the main switch 261 is closed, the indicator light 260 will light, and the motor 163 will be energized to continuously drive the drum 90 counterclockwise, as viewed in Fig. 10, and the drum 140 clockwise. None of the clutches 98, 99, 142, 143, 186 and 187 will be energized at this time so neither the feed belts 16 and 17 or the feed belts 18 and 19 will be running.

In order to start the feeding belts it is merely necessary for the operator to depress manually either of the bag holders 20 or 21. Assuming the operator depresses the right bag holder 20, the switch 39 will be released by the right scale mechanism associated with the bag holder 20 and the blades of the switch 39 will move to their lower position. The solenoid 245 associated with the forward drive clutch 143 for belts 18 and 19 is energized through a circuit from line L2. This circuit is closed through switch 261, lines 262 and 265, the upper blade of switch 39, terminal 277, line 278, the lower blade of switch 38, terminal 285 and lines 286 and 287, the left forward drive clutch 143, lines 252, 250 and L1. When the clutch 143 is engaged, articles are fed forwardly by the belts 18 and 19 into the bag held by the bag holder 21. Simultaneously, the solenoid 245 of the right timing clutch 186 is energized from lines 286 and 288, lines 253, 250 and L1. Also, the solenoid 245 of the right rearward drive clutch 98 is energized from line 286 through switch 212, and lines 290, 255, 250 and L1. When the left forward drive clutch 143, the right reverse clutch 98, and the right timing clutch 186 are engaged, the left feed belts 18 and 19 move forwardly and the right feed belts 16 and 17 move rearwardly, and the timing arm 210 is rotated rearwardly until the switch 212 is actuated.

When the switch 212 is actuated the right reverse clutch 98 is deenergized and the reverse movement of the belts 16 and 17 ceases. The operator may also release the bag holder 20. The left forward drive clutch 143 remains energized to keep the belts 18 and 19 feeding articles forward into the bag held by the bag holder 21, and the right timing clutch 186 remains energized to hold the belts 16 and 17 stationary through a circuit as from L2 through switch 261, lines 262 and 266, the upper blade of switch 38, terminal 274, line 275, terminal 276 of switch 212, lines 286 and 288, and lines 253, 250 and L1.

When the weight of materials in the bag held by the bag holder 21 reaches a predetermined weight, the bag holder 21 descends allowing the switch blades of switch 38 to move to their lower release positions. This breaks the circuit just described and deenergizes the solenoids of the left forward drive clutch 143 and the right timing clutch 186.

At the same time, a circuit is established from L2 through switch 261, lines 262 and 266, the upper blade of switch 38, terminal 279, line 280, the lower blade of switch 39, terminal 281, line 282, switch 213, terminal 291, and line 292 energizes the left reverse drive clutch 99 to drive the belts 18 and 19 in reverse to overcome the forward momentum of the articles thereon and prevent additional articles from spilling into the bag held by the bag holder 21. As the belts 18 and 19 are being driven in reverse the timing arm 211 is moved rearwardly until it actuates the switch 213 to deenergize the left reverse drive clutch 99 and stop the reverse movement of the belts 18 and 19. Also, a circuit is made from terminal 281 on switch 39 through lines 282 and 284 to energize the solenoid 245 of the left timing clutch 187, and the solenoid of the right forward drive clutch 142 is energized from terminal 281 through lines 282, 283, 251, 250 and L1. Thus, as soon as a bag on one side of the machine is filled, the feed belts are stopped and moved rearwardly, and the feed belts on the other side of the machine are moved forwardly to start the filling of a bag at that side.

As explained above, the interconnection between the timing arms 210 and 211 through the timing chains 200 and 201 and the double sprocket 205 causes the arm 210 to be moved forwardly as the arm 211 is moved rearwardly thus releasing the previously actuated switch 212 and preconditioning it for the next cycle of the machine.

As soon as the reverse movement of the belts 18 and 19 has ceased, indicating that the switch 213 has been actuated, the full bag may be removed from the bag holder 21 and an empty bag substituted therefor without interrupting the forward motion of the belts 16 and 17. The right forward drive clutch 142, and the left timing clutch 187 remain energized, even though the switch 38 is actuated by the raising of the now empty bag holder 21, through a circuit from L2 through switch 261, lines 262 and 265, the upper blade of switch 39, terminal 270, line 271, terminal 272, actuated switch 213 and lines 282, 283 and 284.

When the weight in the bag held by the bag holder 20 reaches the predetermined amount, the bag holder 20 descends, permitting the switch blades of switch 39 to move to their lower or release position deenergizing the solenoid of the right forward drive clutch 142, the left timing clutch 187, and energizing the left forward drive clutch 143, the right timing clutch 186 and the right reverse drive clutch 98 in the manner initially described above.

From the above description it may be seen that each of the sets of feed belts 16, 17 and 18, 19 reverses instantly to overcome the forward momentum of the articles thereon when the weight in the bag associated therewith reaches a predetermined weight, and that after a predetermined interval of reverse movement, approximately eight to ten inches, the movement of the feed belts automatically stops. It is further evident that the action of the feed belts is alternate whereby a full bag may be removed and replaced by an empty bag on one of the bag holders while articles are being deposited in the bag on the other holder.

If for any reason the operator fails to remove a bag on one bag holder when full, before the bag on the other bag holder becomes full, both of the bag holders will be depressed at the same time. In this condition of the machine, both switches 38 and 39 are in their release position, that is, the blades are in their lower position. Under these conditions, current from L2 can only reach the two unconnected terminals 295 and 296 and all of the clutches 98, 99, 142, 143, 186 and 187 will be deenergized.

If this condition is allowed to occur the main switch 261 must be opened before either of the full bags can be removed, otherwise as soon as one of the bags is removed the feed belts associated therewith will start and articles will be spilled on the floor. It should therefore be evident that the operator is forced to keep up with the machine in order to avoid having both bag holders 20 and 21 become depressed at the same time. As set forth above, the operator may adjust the speed of the machine operation by rotating the wheel 169 (Figs. 1 and 3) to lengthen or shorten the turnbuckle assembly 167 to change the drive ratio between the variable speed pulley 162 and pulley 160 thus varying the operational speed of the machine.

While a preferred embodiment of the present invention is described herein, it should be noted that various changes may be made therein without departing from the spirit of the invention as defined in the appended claims.

Having thus described my invention what I claim and desire to secure by Letters Patent is:

1. In a bagging machine having a conveying means for depositing articles in a bag detachably secured to a scale mechanism, a drive mechanism comprising a pair of oppositely rotating clutch drive members, a first driven member operatively connected to said conveying means and adapted to engage one of said drive members to drive said conveying means in its bag loading direction, a second driven member operatively connected to said conveying means and adapted to engage the other of said drive members to drive said conveying means in a reverse direction, a timing mechanism connected with said second driven member, means responsive to downward movement of said scale for disengaging said first driven member from its drive member and simultaneously engaging said second driven member with its drive member and actuating said timing mechanism, and means responsive to said timing mechanism for disengaging said second driven member from its drive member after a predetermined interval of operation thereof.

2. In a bagging machine having a conveying means for depositing articles in bags, and a scale mechanism for continuously weighing the articles so deposited, a drive mechanism comprising a rotating forward drive member, an oppositely rotating reverse drive member, a clutch drivingly engageable with said forward drive member and adapted to be selectively drivingly engaged therewith, a clutch drivingly engageable with said reverse drive member and adapted to be selectively drivingly engaged therewith, connector means operatively connecting said conveying means with the clutch engageable with said forward drive member and with the clutch engageable with said reverse drive member, means responsive to downward movement of said scale mechanism for disengaging the forward drive clutch and simultaneously engaging the reverse drive clutch, and a timing means connected with said reverse drive clutch and adapted to disengage said reverse drive clutch after a predetermined interval of reverse movement of the conveying means.

3. In a bagging machine having a conveying means for depositing articles in bags, and a scale mechanism for continuously weighing the articles so deposited, a drive mechanism comprising a rotating forward drive member an oppositely rotating reverse drive member, a solenoid actuated clutch adapted to be selectively drivingly engaged with said forward drive member, a solenoid actuated clutch adapted to be selectively drivingly engaged with said reverse drive member, connector means operatively connecting said conveying means with the clutch engageable with said forward drive member and with the clutch engageable with said reverse drive member, means responsive to downward movement of said scale mechanism to deactivate the solenoid of the forward drive clutch and simultaneously activate the solenoid of the reverse drive clutch, and a solenoid actuated timing means connected with said reverse drive clutch and adapted to deactivate the solenoid of said reverse drive clutch after a predetermined interval of reverse movement of said conveying means.

4. In a bagging machine having a conveying means for depositing articles in a bag detachably secured to a scale mechanism, a transmission assembly for driving said conveying means comprising three shafts mounted in parallel spaced relation with each other, a first drive member rotatably mounted on one of said shafts, a second drive member rotatably mounted on a second of said shafts, means for continuously driving said drive members in opposite directions, a first solenoid operated clutch comprising a first driven member rotatably mounted on said one shaft and adapted to be moved into clutching engagement with said first drive member, a second solenoid operated clutch comprising a second driven member rotatably mounted on said second shaft and adapted to be moved into clutching engagement with said second drive member, a third driven member mounted on the third of said shafts, a third solenoid operated clutch comprising a third drive member rotatably mounted on said third shaft and adapted to be moved into clutching engagement with said third driven member, flexible drive means interconnecting said conveying means said first and second driven members and said third drive member, a timing arm fixed to and extending radially from said third driven member, means defining control circuits for said solenoid actuated clutches, a first switch connected in said circuits and mounted in the path of movement of and adapted to be actuated by said scale mechanism, and a second switch connected in said circuits and mounted in the path of movement of and adapted to be actuated by said timing arm, whereby when said first switch is actuated by downward movement of said scale mechanism said first solenoid clutch is deactivated and said second and third solenoid clutches are activated, and whereby when said second switch is subsequently actuated said second clutch is deactivated.

5. In a bagging machine having two conveying means for depositing articles in separate bags and two scale mechanisms for continuously weighing the articles so deposited, a drive mechanism comprising a forward clutch drive member and an oppositely rotating reverse clutch drive member, two driven members engageable with each of said drive members, a driving connection operatively connecting one of said conveying means with one of the driven members engageable with each of said drive members, a driving connection operatively connecting the other of said conveying means with the other of said driven members engageable with each of said drive members, and means responsive to movement of either of said scale mechanisms for engaging with said reverse clutch drive member the driven member of the conveying means depositing articles in the bag on the scale so moved to drive said conveying means associated with the scale so moved in the reverse direction, and simultaneously engaging with said forward clutch drive member the driven member of the conveying means depositing articles in the bag on the other of said scale mechanisms to drive said conveying means associated with said other of said scale mechanisms in its forward direction.

6. In a bagging machine having first and second conveying means each of which is arranged to deposit articles in a bag detachably secured to one of two scale mechanisms, means connected with each of said conveying means for selectively driving said conveying means in either a forward or reverse direction, means responsive to downward movement of a first of said scale mechanisms to reverse the direction of said first conveying means from forward to reverse and simultaneously initiate forward movement of said second conveying means, and timing means connected with the driving means connected to said first conveying means and arranged to deactivate the driving means connected to said first conveying means after a predetermined interval of reverse movement of said first conveying means, means responsive to subsequent downward movement of the second of said scale mechanisms to reverse the drive of said second conveying means from forward to reverse and simultaneously initiate forward movement of said first conveying means, and second timing means connected with the driving means connected to said second conveying means and arranged to deactivate the driving means connected to said second conveying means after a predetermined interval of reverse movement of said second conveying means.

7. In a bagging machine having two conveying means for depositing articles in bags, and two scale mechanisms for continuously weighing the articles so deposited, a drive mechanism comprising a rotatable forward drive member, an oppositely rotatable reverse drive member, two clutches engageable with said forward drive member and adapted to be selectively drivingly engaged therewith, two clutches engageable with said reverse drive member and adapted to be selectively drivingly engaged therewith, a driving connection operatively connecting each of said conveying means with one of the clutches engageable with said forward drive member and with one of the clutches engageable with said reverse drive member, means responsive to downward movement of either of said scale mechanisms for disengaging the forward drive clutch and simultaneously engaging the reverse drive clutch of the conveying means delivering articles to the scale mechanism so moved and simultaneously engage the forward drive clutch of the other of said conveying means, and a timing means connected with each of said reverse drive clutches, each of said timing means being adapted to disengage the reverse drive clutch with which it is connected after a predetermined interval of reverse movement of the conveying means connected thereto.

8. In a bagging machine having two conveying means for depositing articles in bags, and two scale mechanisms for continuously weighing the articles so deposited, a drive mechanism comprising a rotating forward drive member, an oppositely rotating reverse drive member, two solenoid actuated clutches engageable with said forward drive member and adapted to be selectively drivingly engaged therewith, two solenoid actuated clutches engageable with said reverse drive member and adapted to be selectively drivingly engaged therewith, a driving connection operatively connecting each of said conveying means with one of the clutches engageable with said forward drive member and with one of the clutches engageable with said reverse drive member, means responsive to downward movement of either of said scale mechanisms to deactivate the solenoid of the forward drive clutch and simultaneously activate the solenoid of the reverse drive clutch of the conveying means associated with the scale mechanism so moved and simultaneously activate the solenoid of the forward drive clutch of the other of said conveying means and a solenoid actuated timing means connected with each of said reverse drive clutches, each of said timing means being adapted to deactivate the solenoid of the reverse drive clutch with which it is connected after a predetermined interval of reverse movement of the conveying means connected thereto.

9. In a bagging machine having first and second conveying means for depositing articles in bags detachably secured to first and second scale mechanisms for weighing the articles so deposited, a transmission assembly for driving said conveying means comprising three shafts mounted in parallel spaced relation with each other, a first drive member rotatably mounted on one of said shafts, a second drive member rotatably mounted on a second of said shafts, means for continuously driving said drive members in opposite directions, first and second solenoid operated clutches including first and second driven members respectively mounted for rotation on said one shaft on opposite sides of said first drive member and adapted to be selectively moved into clutching engagement therewith, third and fourth solenoid operated clutches including third and fourth driven members respectively mounted for rotation on said second shaft on opposite sides of said second drive member and adapted to be moved into clutching engagement therewith, fifth and sixth driven members mounted on the third of said shafts, third and fourth drive members mounted for rotation on said third shaft and adapted to be selectively moved into clutching engagement with said fifth and sixth driven members respectively, first flexible drive means interconnecting one of said conveying means with said first and third driven members and with said third drive member, second flexible drive means interconnecting the other of said conveying means with said second and fourth driven members and with said fourth drive member, a timing arm fixed to and extending radially from each of said fifth and sixth driven members, means providing a control circuit for the solenoids of said clutches, first and second switches connected in said circuit and mounted in the path of movement of and adapted to be actuated by said first and second scale mechanisms respectively, and third and fourth switches connected in said circuit and mounted in the path of movement of and adapted to be actuated by said timing arms, whereby when said first switch is actuated by downward movement of said first scale mechanism said first solenoid clutch is deactivated and said second, third and fifth solenoid clutches are activated, and whereby when said third switch is subsequently actuated said third clutch is deactivated, and whereby when said second switch is actuated by said second scale mechanism said second and fifth solenoid clutches are deactivated and said first, fourth and sixth solenoid clutches are activated, and when said fourth switch is subsequently actuated said clutch is deactivated.

10. In a bagging machine having first and second conveying means for depositing articles in a bag detachably secured to first and second scale mechanisms respectively, a transmission assembly for driving said conveying means comprising a plurality of shafts mounted in horizontal parallel spaced relation with each other, and including two outer shafts and a center shaft, a first drive member rotatably mounted on one of said outer shafts, a second drive member rotatably mounted on the other outer shaft, means for continuously driving said drive members in opposite directions, a first pair of solenoid operated clutches each comprising a driven member rotatably mounted on the same shaft with said first drive member and adapted to be selectively moved into clutching engagement therewith, a second pair of solenoid operated clutches each comprising a driven member rotatably mounted on the same shaft with said second drive member and adapted to be selectively moved into clutching engagement therewith, a third pair of driven members mounted on the central shaft, a third pair of solenoid operated clutches each comprising a drive member rotatably mounted on the central shaft and adapted to be selectively moved into clutching engagement with said third pair of driven members, first flexible drive means interconnecting one of said conveying means with one of said first and one of said second pairs of driven members and with one of said pair of drive members, second flexible drive means interconnecting the other of said conveying means with the other of said first and the other of said second pairs of driven members and with the other of said pair of drive members, a timing arm fixed to and extending radially from each of said third pair of said driven members, a control circuit for the solenoids of said clutches, a first switch connected in said circuit and mounted in the path of movement of and adapted to be actuated by one of said scale mechanisms, and a second switch connected in said circuit and mounted in the path of movement of and adapted to be actuated by one of said timing arms.

11. In a bagging machine having two conveying means for depositing articles in separate bags, a drive mechanism comprising a rotatable forward clutch drive member and an oppositely rotating reverse clutch drive member, a first and a second pair of driven clutch members, each pair having one member thereof frictionally engageable with one of said drive members and having the other member thereof frictionally engageable with the other of said drive members, a driving connection operatively connecting one of said conveying means with said first pair of driven clutch members, a driving connection operatively connecting the other of said conveying means with said second pair of driven clutch members, and means for selectively engaging each of said clutch driven members with the clutch drive member with which it is engageable.

12. In a bagging machine having two conveying means for depositing articles in bags, a drive mechanism comprising a rotatable forward drive member, an oppositely rotatable reverse drive member, two clutches engageable with said forward drive member and adapted to be selectively drivingly engaged therewith, two clutches engageable with said reverse drive member and adapted to be selectively drivingly engaged therewith, and a driving connection operatively connecting each of said conveying means with one of the clutches engageable with said forward drive member and with one of the clutches engageable with said reverse drive member.

13. In a machine having a conveyor for depositing articles into bags and means for driving the conveyor in both a forward and reverse direction, a timing mechanism comprising electrically operated clutches for controlling the drive means of said conveyor in either its forward or reverse direction, a normally closed switch in the energizing circuit for the electrical clutch controlling the reverse drive mechanism, a timing arm mounted for movement over a fixed path and adapted to actuate said switch, and means for initiating the movement of said timing arm simultaneous with the energizing of said reverse drive clutch, said timing arm being effective when it strikes the switch in its path of movement to open the same and deenergize said reverse drive clutch.

14. In a machine having a pair of conveyors for depositing articles into separate bags and means for driving each of said conveyors in both a forward and reverse direction, a timing mechanism comprising electrically operated clutches for controlling the drives to said conveyors in either their forward or reverse directions, a normally closed switch in the energizing circuit for the electrical clutch controlling the reverse drive mechanism for each conveyor, a pair of timing arms each mounted for movement along a fixed path and adapted to actuate one of said switches, means for initiating the movement of one of said timing arms simultaneously with the energizing of one of the reverse drive clutches, said timing arm being effective when it strikes the switch in its path of movement to open the same and deenergize said one reverse drive clutch, and means interconnecting said timing arms for conjoint movement in opposite directions, whereby when one arm is moving toward the switch in its path of movement to time the reverse movement of one of the conveyors the other arm is being moved away from the switch in its path and conditioned for its subsequent timing cycle.

15. In an article handling machine having two conveyor belts movable in either a forward or a reverse direction and a rotary timing member, the combination of electrical power means for driving said belts and said timing member, and a control circuit for said power means and including control elements arranged to simultaneously energize said power means for driving one of said belts in a forward direction, the other belt in a rearward direction, and for moving said timing member through a predetermined angular movement.

References Cited in the file of this patent

UNITED STATES PATENTS

| | | |
|---|---|---|
| 607,478 | Richards | July 19, 1898 |
| 875,225 | Vraalstad | Dec. 31, 1907 |
| 1,775,726 | Knigge | Sept. 16, 1930 |
| 1,835,104 | Watson | Dec. 8, 1931 |
| 1,856,884 | Popov | May 3, 1932 |
| 2,316,310 | Bliss | Apr. 13, 1943 |
| 2,469,954 | Dorrington et al. | May 10, 1949 |
| 2,566,210 | Kendall et al. | Aug. 28, 1951 |
| 2,587,959 | Biner | Mar. 4, 1952 |
| 2,613,053 | Dorrington et al. | Oct. 7, 1952 |
| 2,650,058 | Read | Aug. 25, 1953 |
| 2,700,448 | Ames | Jan. 25, 1955 |
| 2,743,896 | Nauta | May 1, 1956 |
| 2,834,227 | Sweet | May 13, 1958 |